United States Patent
Chen et al.

[11] Patent Number: 5,847,545
[45] Date of Patent: Dec. 8, 1998

[54] DUAL A/C AND D/C INPUT POWERED PORTABLE BATTERY CHARGER

[75] Inventors: Solomon Chen, Taipei, Taiwan; Harry Mkhitarian, Glendale, Calif.

[73] Assignee: Superior Communication Products Inc., Covina, Calif.

[21] Appl. No.: 802,721

[22] Filed: Feb. 20, 1997

Related U.S. Application Data

[63] Continuation-in-part of Ser. No. 603,634, Feb. 20, 1996, abandoned.

[51] Int. Cl.$^6$ ............................................. H02J 7/00
[52] U.S. Cl. ............................ 320/138; 363/142; 307/18
[58] Field of Search .................... 320/56, 2, 107, 320/111, 138; 363/146, 142, 147; 307/18, 21, 22, 23, 27, 28; 439/131, 170–175

[56] References Cited

U.S. PATENT DOCUMENTS

| | | |
|---|---|---|
| 4,160,941 | 7/1979 | Bennett ..................................... 320/56 |
| 4,514,790 | 4/1985 | Will ........................................ 362/183 |
| 4,922,178 | 5/1990 | Matuszewski et al. ................. 320/111 |
| 5,160,879 | 11/1992 | Tortola et al. .......................... 320/111 |
| 5,414,610 | 5/1995 | Brainard ................................... 363/21 |
| 5,499,187 | 3/1996 | Smith ..................................... 363/142 |
| 5,510,691 | 4/1996 | Palatov ....................................... 320/2 |
| 5,610,497 | 3/1997 | Croughwell .............................. 320/15 |

FOREIGN PATENT DOCUMENTS

| | | |
|---|---|---|
| 823052 | 1/1956 | Germany . |
| 0038376A2 | 9/1980 | Germany . |
| 0510300A2 | 1/1992 | Germany . |
| WO8204355 | 6/1982 | United Kingdom . |

*Primary Examiner*—Peter S. Wong
*Assistant Examiner*—Gregory J. Toatley, Jr.
*Attorney, Agent, or Firm*—Sheldon & Mak; Denton L. Anderson

[57] ABSTRACT

A dual power battery charger for charging a rechargeable battery having power input terminals. The battery charger comprising: (a) a battery charger shell; (b) a first set of input terminals pivotably attached to the shell for electrical connection to a direct current power source at a first voltage; (c) a second set of input terminals for electrical connection to an alternating current power source at a second voltage; (d) a set of output terminals for electrical connection to the power input terminals of the rechargeable battery; (e) a first converter circuit electrically connected between the first set of input terminals and the output terminals of the battery charger for converting a direct current at the first voltage to a direct current at a third voltage suitable for charging the battery; and (f) a second converter circuit electrically connected between the second set of input terminals and the first set of input terminals of the battery charger for converting an alternating current at the second voltage to a direct current at the first voltage.

13 Claims, 6 Drawing Sheets

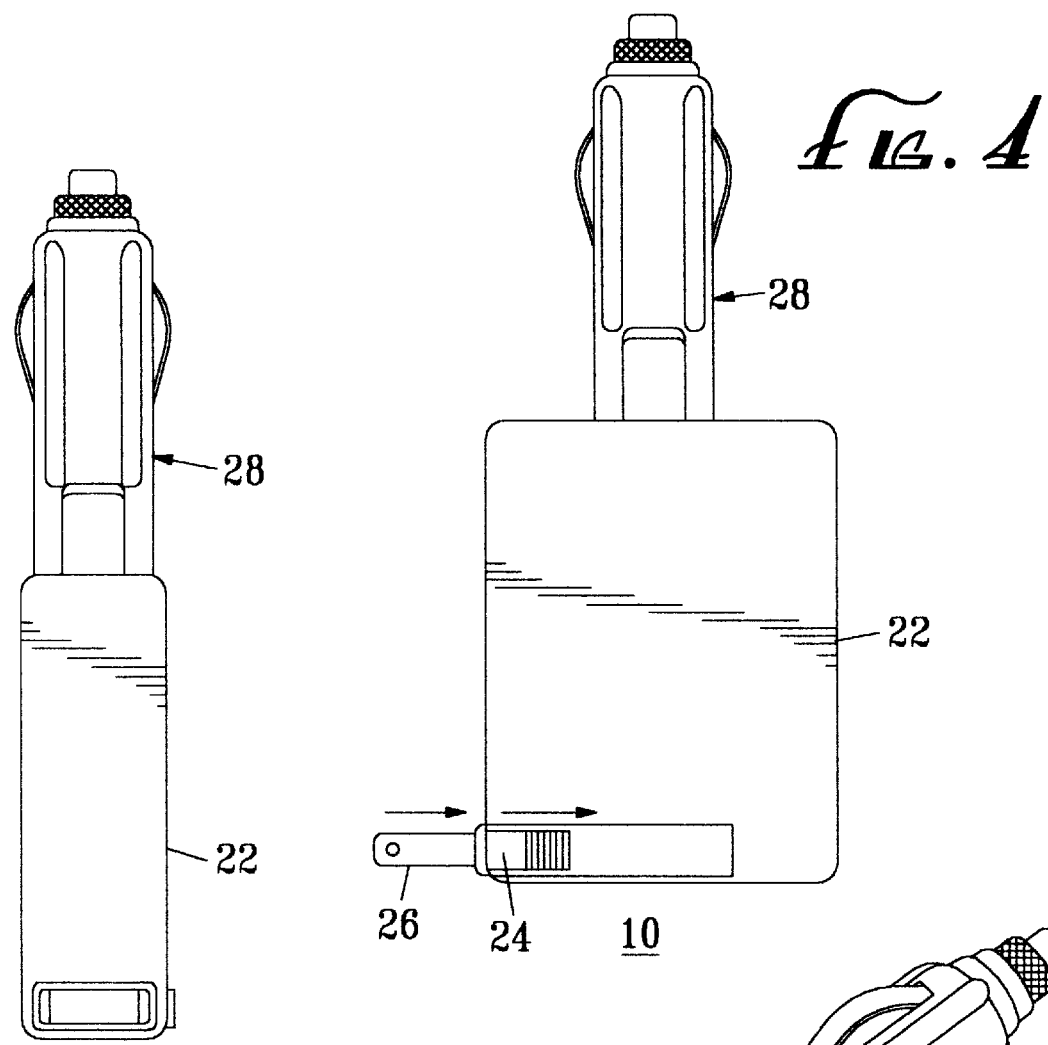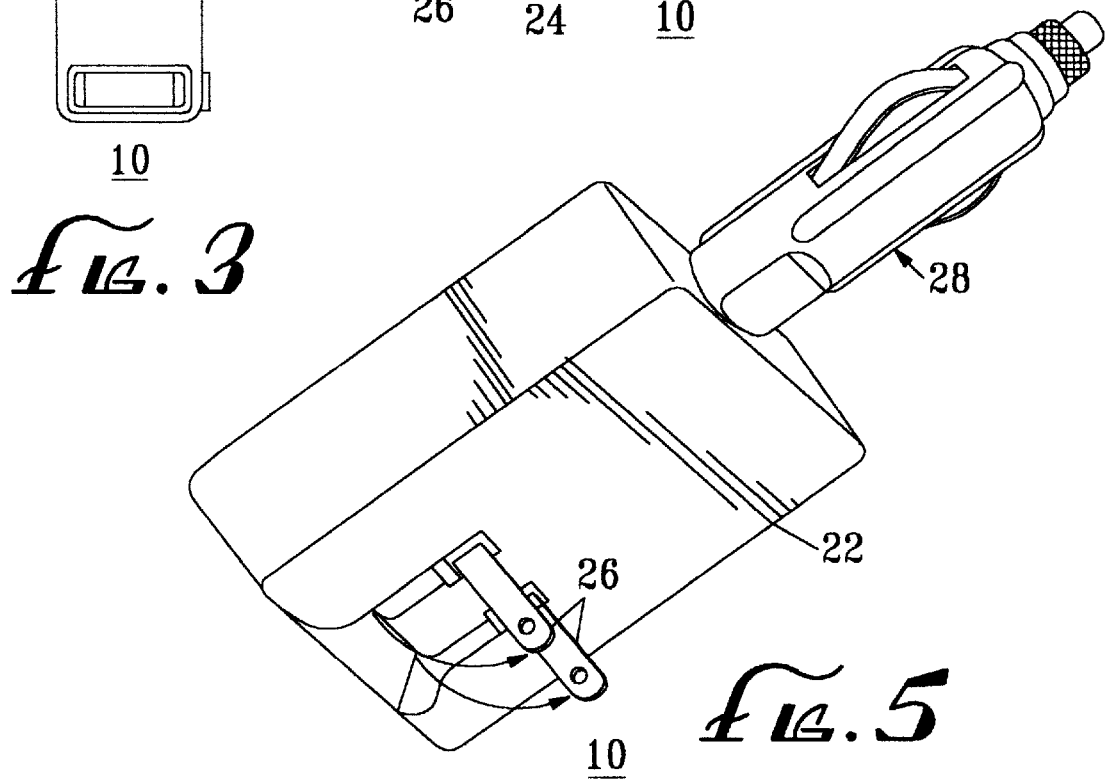

DUAL A/C AND D/C INPUT POWERED PORTABLE BATTERY CHARGER

BACKGROUND

This is a continuation-in-part of application Ser. No. 08/603,634, filed Feb. 20, 1996, now abandoned.

The present invention generally relates to battery chargers, and in particular to dual power battery chargers.

With increasing popularity of battery-powered electric and electronic devices, many manufacturers provide rechargeable batteries with such devices to save battery replacement costs for end-users. An increasingly common class of portable electronic devices includes personal communication devices such as portable cellular phones. Virtually all cellular phones utilize rechargeable battery packs which a user can recharge periodically as needed.

Many manufacturers provide battery rechargers designed to operate from a DC power source such as automobile batteries. Such DC-operated rechargers include a dedicated adapter designed to interface with standard cigarette-lighter receptacles utilized in automobiles. As such, while traveling, a user must utilize a DC-operated recharger to recharge batteries.

In order to recharge batteries at homes or offices where an AC power source is available, a user must utilize an AC-powered battery recharger. Typically, an AC-powered battery recharger includes an adapter to interface with standard wall power outlet units installed in homes or offices. The AC-powered rechargers also include transformer circuits for transforming standard 110 volt or 220 volt AC voltage to 12 volt DC voltage required for recharging batteries.

Because DC-powered rechargers are designed to operate on direct current and only interface with standard cigarette-lighter housings, a user cannot utilize DC-powered rechargers to recharge batteries from an AC power source. Similarly, because AC-powered battery chargers are designed to operate on alternating current and to interface with standard wall power outlet units, a user cannot utilize AC-powered battery rechargers with DC power sources such as cigarette-lighter receptacles.

As such, a user who requires the ability to recharge batteries both from DC power sources in automobiles, and from AC power sources must, disadvantageously, purchase and maintain both a DC-powered recharger and an AC-powered recharger. Further, a user who desires to have both AC and DC recharging capabilities in a location other than the user's residence or office, must inconveniently transport the user's AC-powered recharger from the residence or office to the other locations. Therefore, not only is it costly to purchase and maintain two different recharger devices, the user must constantly keep track of the location at which the user's AC-powered recharger unit resides.

There is, therefore, a need for a battery recharger which can physically interface with both cigarette-lighter receptacles found in automobiles and AC-power outlets found in residences and offices. There is also a need for such a recharger to electrically interface with both DC power sources and AC power sources to provide DC power suitable for recharging batteries.

SUMMARY

The present invention satisfies these needs. The present invention provides a dual power battery charger for charging a rechargeable battery having power input terminals. The battery charger comprises: (a) a battery charger shell; (b) a first set of input terminals for electrical connection to a direct current power source at a first voltage; (c) a second set of input terminals for electrical connection to an alternating current power source at a second voltage; (d) a set of output terminals for electrical connection to the power input terminals of the rechargeable battery; (e) a first converter circuit electrically connected between the first set of input terminals and the output terminals of the battery charger for converting a direct current at the first voltage to a direct current at a third voltage suitable for charging the battery; and (f) a second converter circuit electrically connected between the second set of input terminals and the first set of input terminals of the battery charger for converting an alternating current at the second voltage to a direct current at the first voltage.

The battery charger further comprises an alternating current adapter for interfacing the battery charger to an alternating current power outlet, wherein the adapter is electrically connected to the second set of input terminals. Preferably, the alternating current adapter comprises two prongs for interface with a residential wall power outlet unit.

The battery charger further comprises a direct current adapter for interfacing the battery charger to a direct current power outlet, wherein the adapter is electrically connected to the first set of input terminals. Preferably, the direct current adapter can interface with an automobile cigarette-lighter receptacle. The battery charger further comprises a shell for housing the first and second set of input terminals, the output terminals, and the first and the second converter circuits. The alternating current adapter and the direct current adapter can be externally attached to the housing.

In a preferred embodiment, the direct current adapter is pivotably attached to the housing for the battery charger and is rotatable about the housing in an arc. In yet another embodiment, the alternating current adaptor is also pivotably connected to the adapter housing and is rotatable about the housing in an arc.

In another embodiment, the battery charger of the present invention comprises: (a) a first set of input terminals for electrical connection to an alternating current power source at a first voltage; (b) a second set of input terminals for electrical connection to a direct current power source at a second voltage; (c) a set of output terminals for electrical connection to the power input terminals of the rechargeable battery; (d) a first converter circuit electrically connected between the first set of input terminals and the output terminals of the battery charger for converting an alternating current at the first voltage to a direct current at a third voltage suitable for charging the battery; and (e) a second converter circuit electrically connected between the second set of input terminals and the output terminals of the battery charger for converting a direct current at the second voltage to a direct current at the third voltage suitable for charging the battery.

DRAWINGS

These and other features, aspects and advantages of the present invention will become understood with reference to the following description, appended claims and accompanying drawings where:

FIG. 3 is a side elevation view of the battery charger of FIG. 2;

FIG. 4 is a bottom elevation view of the battery charger of FIG. 2;

FIG. 5 is a perspective elevation view of another embodiment of the battery charger of the present invention;

DESCRIPTION

Figure 1:
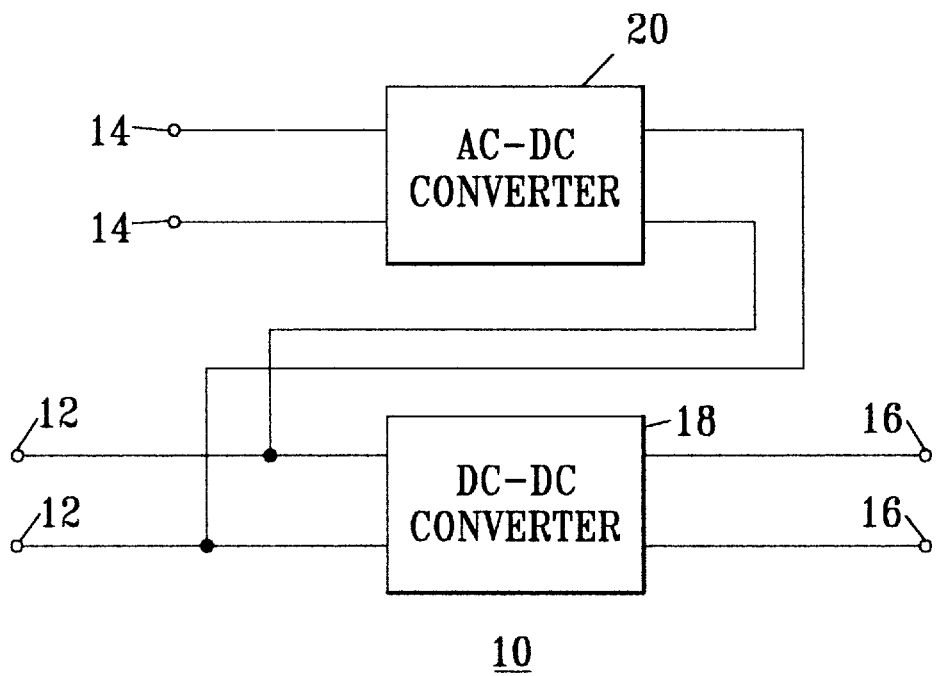
FIG. 1 is a block diagram of a dual power battery charger according to the present invention.

Referring to FIG. 1, an embodiment of a dual power battery charger 10 according to the present invention for charging a rechargeable battery with power input terminals is shown. The battery charger 10 comprises: (a) a first set of input terminals 12 for electrical connection to a direct current power source at a first voltage; (b) a second set of input terminals 14 for electrical connection to an alternating current power source at a second voltage; (c) a set of output terminals 16 for electrical connection to the power input terminals of the rechargeable battery; (d) a first converter circuit 18 electrically connected between the first set of input terminals 12 and the output terminals 16 of the battery charger 10 for converting a direct current at the first voltage to a direct current at a third voltage suitable for charging the battery; and (e) a second converter circuit 20 electrically connected between the second set of input terminals 14 and the first set of input terminals 12 of the battery charger 10 for converting an alternating current at the second voltage to a direct current at the first voltage. As such, the first converter circuit 18 and the second converter circuit 20 are electrically connected in series.

Figure 2:
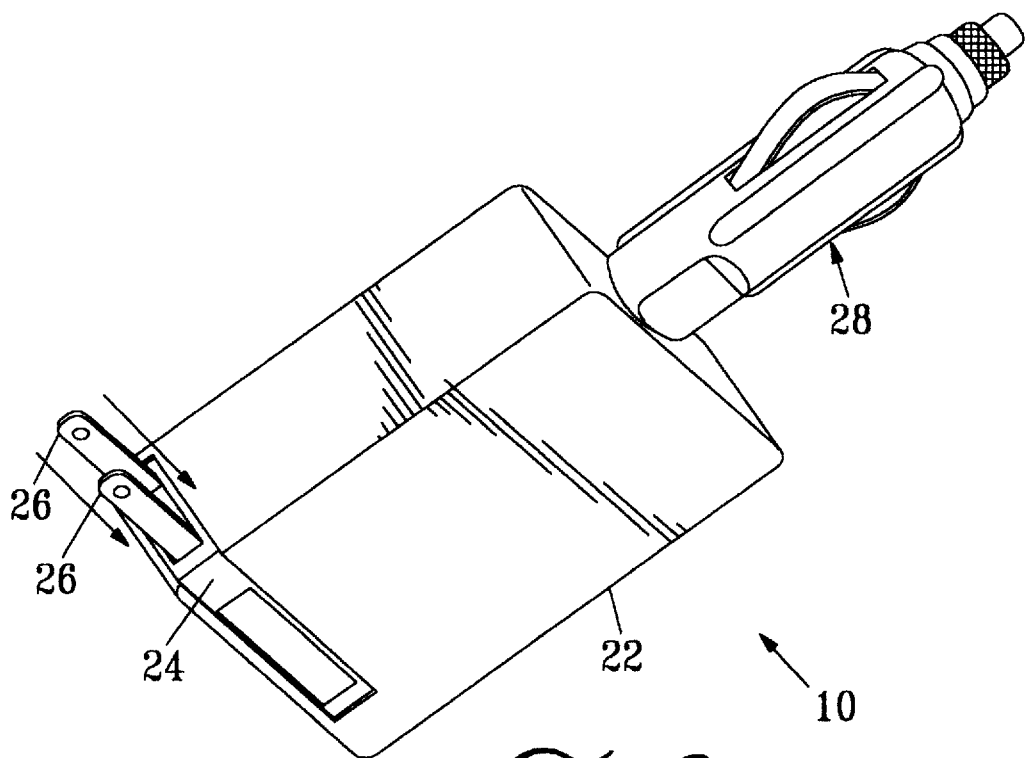
FIG. 2 is a perspective elevation view of a dual power battery charger according to the present invention.

Referring to FIGS. 2–4, the battery charger 10 preferably further comprises a shell 22 for housing the components of the battery charger 10 discussed above. The battery charger 10 further comprises an alternating current adapter 24 for interfacing the battery charger 10 to an alternating current power outlet, wherein the adapter 24 is electrically connected to the second set of input terminals 14. Preferably, the alternating current adapter 24 comprises two prongs 26 for interface with a residential power outlet unit. For example, a NEMA 5-15P plug standard 125VAC, 10A can be utilized.

The battery charger 10 further comprises a direct current adapter 28 for interfacing the battery charger 10 to a direct current power outlet, wherein the adapter 28 is electrically connected to the first set of input terminals 12. Preferably, the direct current adapter 28 comprises an apparatus for interface with an automobile cigarette-lighter receptacle. For example, a cigarette lighter adapter (1215VDC, 15a) can be utilized. As shown in FIG. 2, the alternating current adapter 24 and the direct current adapter 28 are externally attached to the shell 22 and are electrically connected to the first converter circuit 18 and the second converter circuit 20 through the shell 22, respectively.

As such, advantageously, the battery charger 10 of the present invention can be plugged into an automobile's cigarette-lighter housing for recharging batteries while traveling, and can also be plugged into wall power outlet units to recharge batteries using alternating current.

The alternating current adapter 24 comprises two prongs 26 slidably disposed in the shell 22. To plug the battery charger 10 into a wall power outlet unit, the prongs are exposed by sliding them out of the shell 22. Sliding prongs are readily available from many manufacturers.

Figure 6:
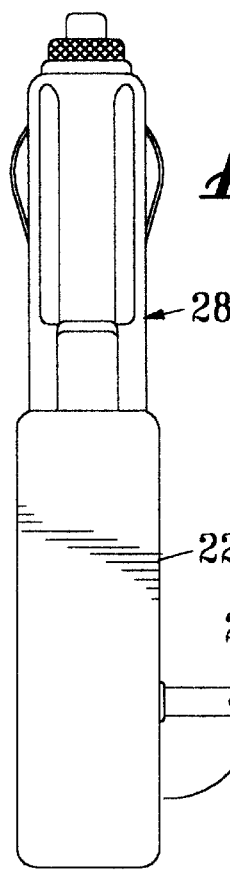
FIG. 6 is a side elevation view of the battery charger of FIG. 5.
Figure 7:
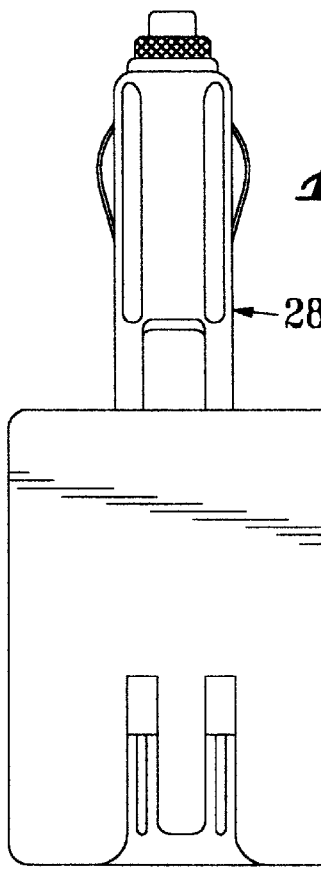
FIG. 7 is a bottom elevation view of the battery charger of FIG. 5.

Referring to FIGS. 5–7, another embodiment of the battery charger 10 of the present invention is shown. In this embodiment, the alternating current adapter 24 comprises a set of prongs 26 rotatably attached to the shell 22. Rotating prongs are readily available from many manufacturers. To plug the battery charger 10 into a wall power outlet unit, the prongs 26 are rotated away from the shell 22 to expose the prongs. In all other aspects, the embodiment of the battery charger 10 shown in FIGS. 5–7 is the same as the embodiment of the battery charger 10 shown in FIGS. 2–4.

Figure 8:
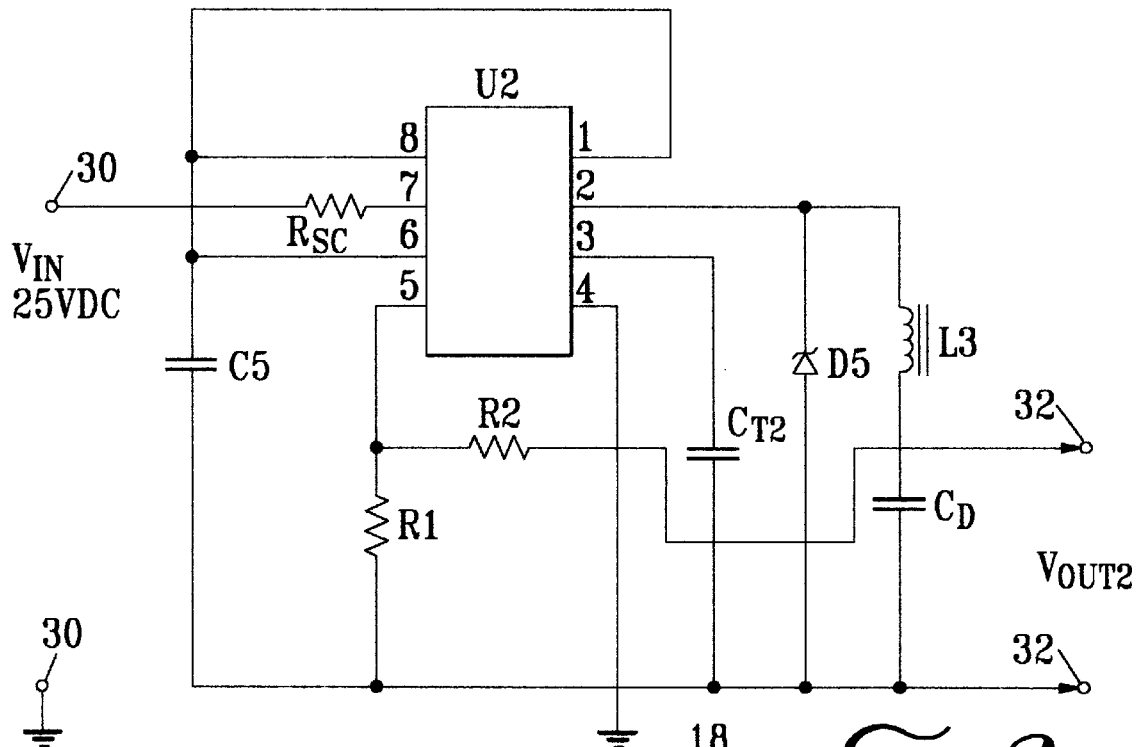
FIG. 8 is an embodiment of a direct current converter circuit utilized in the battery charger of the present invention.

Referring to FIG. 8, an embodiment of the first converter circuit 18 for converting a direct current at the first voltage ranging between about 12 volts to about 25 volts, to a direct current at the third voltage of about 12 volts for charging a battery is shown. The circuit comprises a pair of input terminals 30 for connection to a direct current power source, and a pair of output terminals 32 for providing a direct current for charging a battery. The circuit further comprises resistors R1, R2 (3.6K), and Rsc (0.33); capacitors Co (470 $\mu$F LYTIC), C5 (100 $\mu$F 25 V POLARIZED LYTIC), and CT2 (470 PF FILM); transformer L3 (220 $\mu$H); zener diode D5 (1N5819); and integrated circuit U2 (MOTOROLA MC34063). The circuit components are electrically interconnected as shown in FIG. 8.

The IC U2 is a monolithic control circuit including functions required for DC to DC converters. U2 includes an internal temperature compensated reference, comparator, controlled duty cycle oscillator with an active current limit circuit, driver and high current output switch. The oscillator in the IC U2 is composed of a current source and sink which charges and discharges the external timing capacitor CT2 between an upper and lower preset threshold. The typical charge and discharge currents are 35 $\mu$A and 200 $\mu$A respectively, yielding about a 1 to 6 ratio. Thus, in a charge-discharge cycle, the ramp-up period is 6 times longer than that of the ramp-down period. The upper threshold is equal to the internal reference voltage of 1.25 volts and the lower is approximately equal to 0.75 V. The oscillator runs continuously at a rate controlled by the selected value of the capacitor CT2.

The first converter circuit 18 utilizes a step-down converter. The inductor L3 is switched across the input voltage through an internal switch within the integrated circuit U2. When the switch is turned off, the inductor L3 discharges to the output capacitor $C_0$. A regulated DC output voltage is obtained across the capacitor $C_0$ and is controlled by varying the on time of the switch. The capacitor CT2 is used to set the on time of the switch. The capacitor C5 is the input filter capacitor and is rated for about 35 V DC. The resistors R1 and R2 are used to set the output voltage value. The resistor $R_{SC}$ is used to set the maximum output current value.

The switch in the IC U2 interrupts the input voltage and provides a variable duty cycle squarewave to a simple LC filter formed by L3 and $C_0$. The filter averages the squarewaves producing a dc output voltage that can be set to any level less than the input by controlling the percent conduction time of the switch to that of the total switching cycle time. Thus, $$V_{out}=V_{in}(\% \ T_{on})=V_{in}(T_{on}/T_{on}+T_{off})$$

The IC U2 achieves regulation by varying the on-time ($T_{on}$) and the total switching cycle time. As the switch is off, the inductor L3 current IL3 is zero, and the output voltage Vout is at its nominal value. The output voltage across capacitor $C_0$ will eventually decay below nominal because it is the only component supply current into the external load. This voltage deficiency is monitored by the switching control circuit and causes it to drive the switch into saturation. The inductor current will start to flow from Vin through the switch and, $C_0$ in parallel with the load, and rise at a rate of $\Delta I/\Delta t=V/L$. The voltage across the inductor is equal to Vin-Vsat-Vout and the peak current at any instant is:

$$IL=(Vin-Vsat-Vout/L)t$$

At the end of the on-time, the switch is turned off. As the magnetic field in the inductor starts to collapse, it generates a reverse voltage that forward biases D1 and, the peak current will decay at a rate of $\Delta I/\Delta t=V/L$ as energy is supplied to $C_0$ and the load. During quiescent operation the voltage output voltage is constant and that the system is operating in the discontinuous mode.

Figure 9:
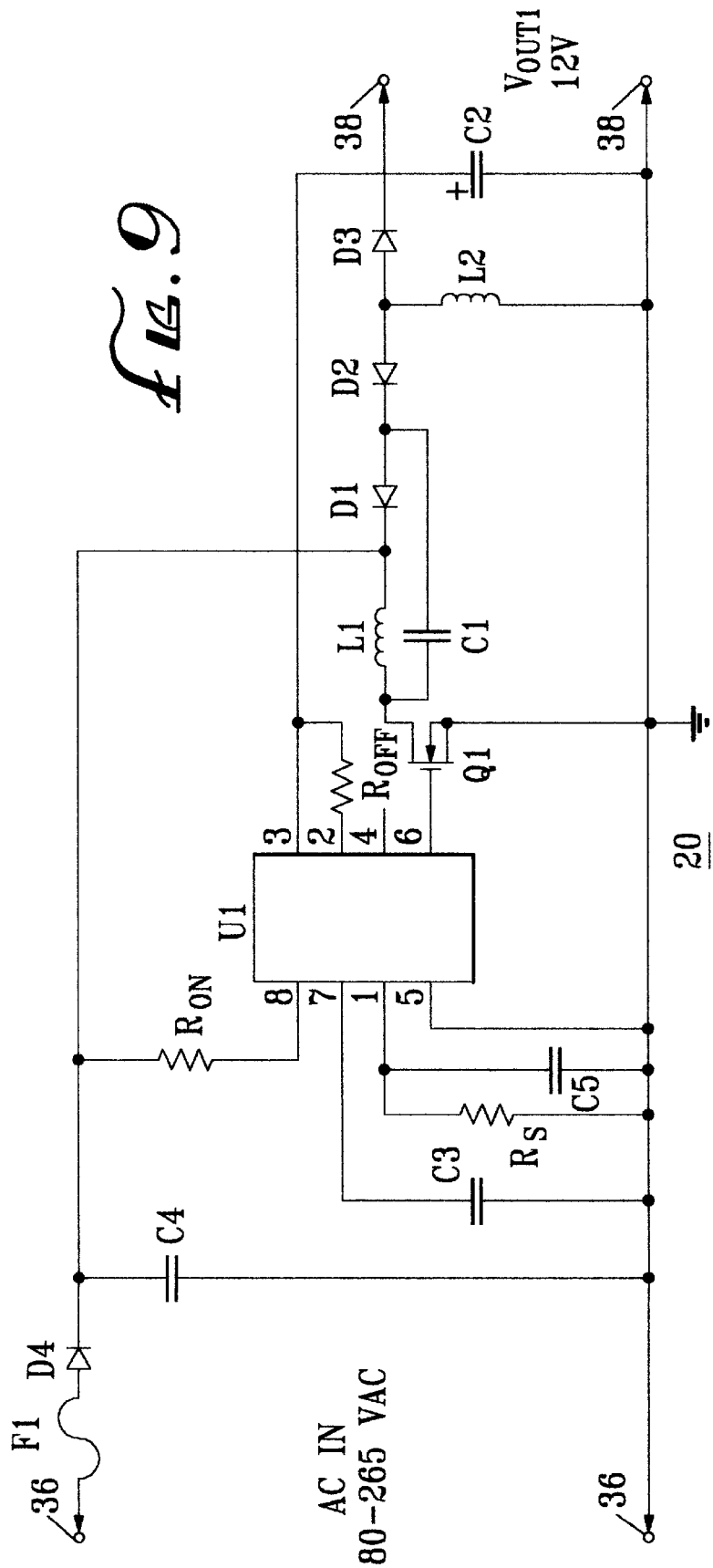
FIG. 9 is a block circuit diagram of an embodiment of an alternating current converter circuit utilized in the battery charger of the present invention.

Referring to FIG. 9, an embodiment of the second converter circuit 20 for converting an alternating current to a direct current is shown. The converter circuit comprises a pair of input terminals 34 for electrical connection to an AC power source, and a pair of output terminals 36 for providing direct current to the first converter circuit 18 as shown in FIG. 1.

The second converter circuit 20 further comprises resistors Ron (330K 400 V), Roff (150K), and Rs (2M); capacitors C1 (0.15 $\mu$F FILM), C2 (22 $\mu$F 35 V LYTIC), C3 (1 $\mu$F POLARIZED LYTIC), C4 (2.2 $\mu$F 450 V POLARIZED LYTIC), CT1 (150 PF FILM); diodes D1 (1N4937), D2 (1N4937), D3 (1N4935), D4 (1N4006); inductors L1 (1 mH 400 V), L2 (70 $\mu$H); MOSFET transistor Q1; fuse F1 (0.25 A FUSE); and integrated circuit U1 (MOTOROLA UCC3889). The circuit components are electrically interconnected as shown in FIG. 9. All of the circuit components for the first converter circuit 18 are readily available as recognized by practitioners in the art.

The converter circuit converts an input alternating current at the second voltage ranging from about 80 volts to about 265 volts to a direct current at the first voltage of about 12 volts. The converter circuit utilizes a cascaded Flyback Converter operated in the discontinuous current mode. Two Flyback stages in series are used to perform voltage transformation. The first Flyback stage includes the inductor L1 which is switched across the input voltage when the MOSFET Q1 turns on. Energy stored is in inductor L1 as current rises linearly, until the MOSFET Q1 is turned off. The inductor L1 then discharges into the capacitor C1 with the diode D1 conducting. In steady state operation, the switching action of the MOSFET Q1 develops a net direct current voltage across the capacitor C1, which is the output capacitor of the first Flyback Converter stage.

The second Flyback Converter stage includes the inductor L2 which is switched across the capacitor C1 while the MOSFET Q1 is on. The voltage across the inductor L2 is negative with respect to ground, and energy is stored in the inductor L2 as the current rises linearly. When the MOSFET Q1 is turned off, the inductor L2 discharges into the capacitor C2. A regulated direct current output voltage is obtained across the capacitor C2 which can be controlled by varying the on-time of the MOSFET Q1. The capacitor C3 maintains the voltage supply for the integrated circuit U1 within the integrated circuit U1's UVLO hysteresis region when the second Flyback Converter begins operation. The capacitor C4 is a bulk input capacitor and is rated at or above 450 VCD, and the diodes D1 through D4 are 800 volt type diodes.

Because the circuit operates in the discontinuous inductor current mode, diode switching speed is not critical. However, the diodes should have recovery times at or below 0.25 ms. For efficient high-frequency operation standard 1N4937 type 600 volt diodes can be used in high-voltage switching, and lower-voltage 1N4935 diodes can be used as output diodes. The timing capacitor CT1, and resistors Ron and Roff are used to set the operating frequency value of the circuit. The resistor R1 is rated for about 400 volts. The resistor Rs is connected in parallel with the timing capacitor CT1 and is used to discharge the capacitor CT1 when the converter output voltage goes to 0. The placement of the resistor Rs also sets the maximum OFF-time of the MOSFET Q1 and only is used to program the minimum frequency for start-up phase of the converter and for short-circuit protection.

Figure 10:
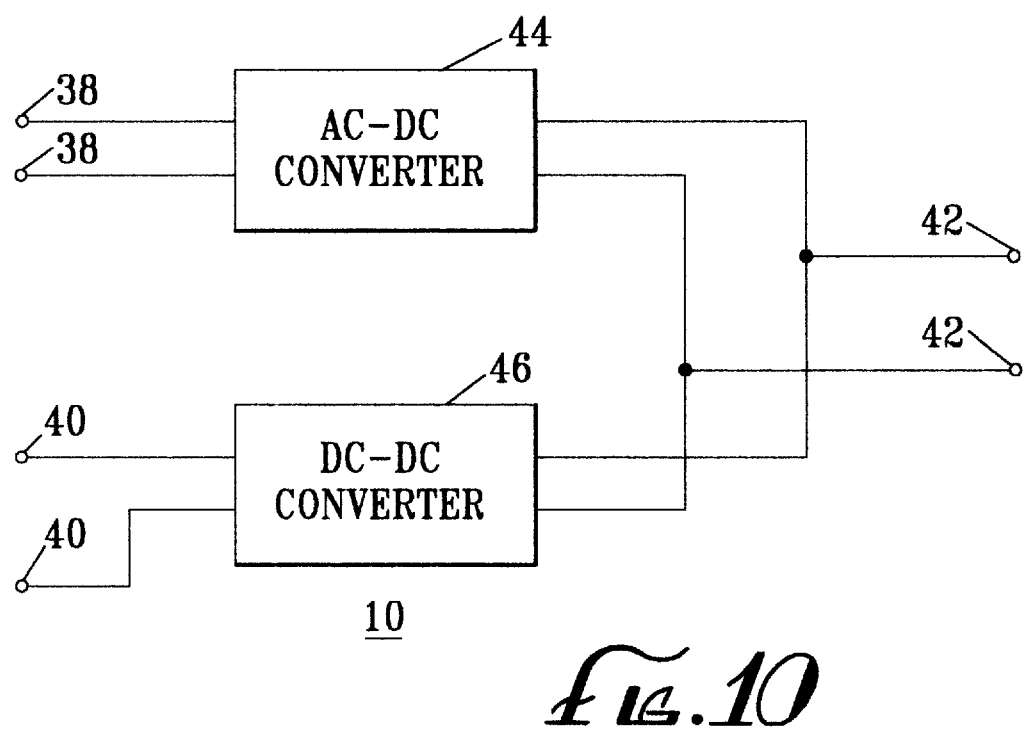
FIG. 10 is a block diagram of another embodiment of the battery charger of the present invention.
Figure 11:
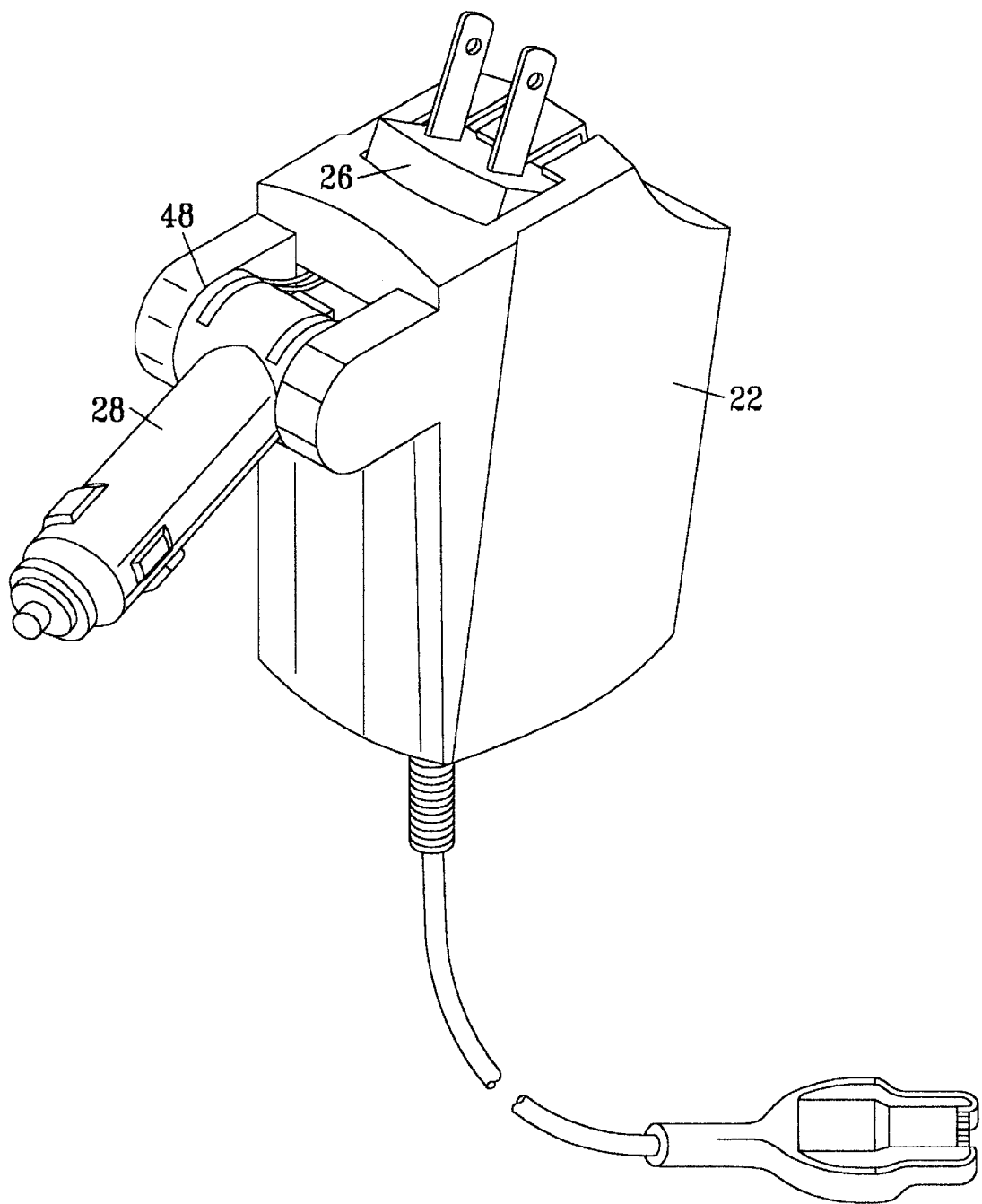
FIG. 11 is a perspective view of the battery charger according to the present invention, with the direct current adaptor pivotably connected to the battery charger housing.

Referring to FIG. 10, in accordance with another embodiment of the present invention, the battery charger 10 includes: (a) a set of AC input terminals 38, (b) a set of DC input terminals 40, (c) a set of output terminals 42, (d) an AC to DC converter 44 electrically connected between the AC input terminals 38 and the output terminals 42, and (e) a DC to DC converter 46 electrically connected between the DC input terminals 40 and the output terminals 42. The AC to DC converter 44 converts an AC voltage in the range of about 80–265 volts to a direct current voltage of about 12 volts suitable for charging batteries. The DC to DC converter 46 converts a DC voltage of about 25 volts to a DC output voltage of about 12 volts. The circuit diagrams for the AC to DC and DC to DC converters illustrated in FIGS. 8 and 9, respectively, can be utilized for the AC converter 44 and DC converter 46 of the embodiment of the battery charger 10 shown in FIG. 10. The battery charger 10 can further comprise: (a) an AC adapter 24 electrically connected to the AC input terminals 38, (b) a DC adapter 28 electrically connected to the DC input terminals 40, and a (c) housing 22, all as described above.

In a preferred embodiment, the direct current adaptor 28 is connected to the shell 22 for housing the battery charger circuit by a pivot mechanism 48. The direct current adapter 28 is rotatable about the pivot within an arc angle, such as 180°. The pivot mechanism 48 allows the direct current adapter 28 to be plugged into an automobile cigarette receptacle without obstruction by the housing 22, and also allows for compact storage of the battery charger by folding the direct current adapter 28 adjacent the housing 22 when the battery charger is not in use.

To recharge batteries using a car battery, a user inserts the direct current adapter 28 into the car's cigarette receptacle. For a standard cellular phone with battery types such as NiCd, NiMH, Li-Ion chemistry, etc., the battery charger 10 can charge a battery in approximately four to five hours. For charging the battery with an alternating current power source, the user inserts the alternating current adapter prongs 26 directly into a wall power outlet receptacle. With AC power input, the battery charger 10 charges a cellular phone battery described above in approximately eight to ten hours. For use with cellular phone, preferably the battery charger 10 utilizes the phone's data port or a charge port to eliminate the need for a bulky desktop housing to hold the phone. Preferably, the dimensions for the housing do not exceed 3"×1"×2" (L×H×W).

The above embodiments of the invention are only a few possible examples of the battery charger 10 of the present invention. It needs to be understood that the present invention is not limited to operation in accordance with the embodiments discussed in this description, and that one skilled in the art would readily understand how to modify the invention as disclosed to obtain equivalent results without departing from the spirit and scope of the present invention. For example, the sliding or rotating AC prongs for the AC adapter can be replaced by a power cord attached to a plug for interface with wall outlet units.

What is claimed is:

1. A portable dual power battery charger for charging a rechargeable battery having power input terminals, the battery charger comprising:
   (a) a battery charger shell;
   (b) a first set of input terminals connected to the shell for electrical connection to a direct current power source at a first voltage, the first set of input terminals comprising a direct current adaptor having a single probe pivotably attached to the shell member, the probe being sized and dimensioned to interface with an automobile cigarette lighter housing;
   (c) a second set of input terminals for electrical connection to an alternating current power source at a second voltage;
   (d) a set of output terminals for electrical connection to the power input terminals of the rechargeable battery;
   (e) a first converter circuit within the shell, the first converter circuit electrically connected between the first set of input terminals and the output terminals of the battery charger for converting a direct current at the first voltage to a direct current at a third voltage suitable for charging the battery; and
   (f) a second converter circuit within the shell, the second converter circuit electrically connected between the second set of input terminals and the first set of input terminals of the battery charger for converting an alternating current at the second voltage to a direct current at the first voltage.

2. The battery charger of claim 1 further comprising an alternating current adapter for interfacing the battery charger to an alternating current power outlet, wherein the adapter is electrically connected to the second set of input terminals.

3. The battery charger of claim 2 wherein the alternating current adapter comprises a pair of pivotable prongs mechanically connected to the shell for interface with a residential power outlet unit, the prongs being fully retractable into the battery charger shell.

4. The battery charger of claim 1 wherein the probe is pivotable with respect to the shell within an arc angle of between 90° and 180°.

5. The battery charger of claim 1 wherein the volume of the battery charger shell is no greater than about 6 square inches.

6. A portable dual power battery charger for charging a rechargeable battery having power input terminals, the battery charger comprising:
   (a) a battery charger shell;
   (b) a first set of input terminals for electrical connection to a direct current power source at a first voltage;
   (c) a direct current adapter comprising a single probe sized and dimensioned to interface with an automobile cigarette lighter housing, the probe being pivotably attached to the shell for interfacing the battery charger to a direct current power outlet, wherein the adapter is electrically connected to the first set of input terminals;
   (d) a second set of input terminals for electrical connection to an alternating current power source at a second voltage;
   (e) an alternating current adapter for interfacing the battery charger to an alternating current power outlet, wherein the adapter is electrically connected to the second set of input terminals;
   (f) a set of output terminals for electrical connection to the power input terminals of the rechargeable battery;
   (g) a first converter circuit within the shell, the first converter circuit electrically connected between the first set of input terminals and the output terminals of the battery charger for converting a direct current at the first voltage to a direct current at a third voltage suitable for charging the battery; and
   (h) a second converter circuit within the shell, the second converter circuit electrically connected between the second set of input terminals and the first set of input terminals of the battery charger for converting an alternating current at the second voltage to a direct current at the first voltage.

7. The battery charger of claim 6 wherein the direct current adapter is pivotable with respect to the shell within an arc angle of between 90° and 180°.

8. A portable dual power battery charger for charging a rechargeable battery having power input terminals, the battery charger comprising:
   (a) a battery charger shell;
   (b) a first set of input terminals for electrical connection to an alternating current power source at a first voltage;
   (c) a second set of input terminals pivotably connected to the shell for electrical connection to a direct current power source at a second voltage;
   (d) a set of output terminals for electrical connection to the power input terminals of the rechargeable battery;
   (e) a first converter circuit electrically connected between the first set of input terminals and the output terminals of the battery charger for converting an alternating current at the first voltage to a direct current at a third voltage suitable for charging the battery; and
   (f) a second converter circuit electrically connected between the second set of input terminals and the output terminals of the battery charger for converting a direct current at the second voltage to a direct current at the third voltage suitable for charging the battery;
   wherein the first converter circuit and the second converter circuit are operatively independent, such that a failure of the first converter circuit does not prevent the second converter circuit from operating and such that a failure of the second converter circuit does not prevent the first converter circuit from operating.

9. The battery charger of claim 8 further comprising an alternating current adapter for interfacing the battery charger to an alternating current power outlet, wherein the adapter is electrically connected to the first set of input terminals.

10. The battery charger of claim 9 wherein the alternating current adapter comprises a pair of pivotable prongs mechanically connected to the shell for interface with a residential power outlet unit, the prongs being fully retractable into the battery charger shell.

11. The battery charger of claim 8 wherein the second set of input terminals is rotatable with respect to the shell within an arc angle of between 90° and 180°.

12. The battery charger of claim 8 wherein the volume of the battery charger shell is no greater than about 6 square inches.

13. The battery charger of claim 8 wherein the second set of input terminals comprises a single probe sized and dimensioned to interface with an automobile cigarette housing.

\* \* \* \* \*